(12) United States Patent
Sun

(10) Patent No.: US 12,443,534 B2
(45) Date of Patent: Oct. 14, 2025

(54) REFERENCE FILE MANAGEMENT FOR ARTIFICIAL INTELLIGENCE MODELS

(71) Applicant: Sandisk Technologies, Inc., Milpitas, CA (US)

(72) Inventor: Chao Sun, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/440,263

(22) Filed: Feb. 13, 2024

(65) Prior Publication Data

US 2025/0258774 A1    Aug. 14, 2025

(51) Int. Cl.
*G06F 12/08* (2016.01)
*G06F 12/0862* (2016.01)

(52) U.S. Cl.
CPC .................. *G06F 12/0862* (2013.01)

(58) Field of Classification Search
CPC .................................................. G06F 12/0862
See application file for complete search history.

(56) References Cited

U.S. PATENT DOCUMENTS

| | | | |
|---|---|---|---|
| 11,514,028 B2 | 11/2022 | Pathak et al. | |
| 2004/0098650 A1* | 5/2004 | Rajsuman | G11C 29/56 714/742 |
| 2020/0272566 A1 | 8/2020 | Saeki | |

FOREIGN PATENT DOCUMENTS

| | | |
|---|---|---|
| CN | 102129472 B | 12/2012 |
| CN | 115310605 A | 11/2022 |
| KR | 101975101 B1 | 5/2019 |

OTHER PUBLICATIONS

Dave Bergstein, Solving Complex Problems with Vector Databases; Mar. 8, 2022; New Tech Forum.
Yang et al., "SGDP: A Stream-Graph Neural Network Based Data Prefetcher"; Apr. 7, 2023; International Joint Conference on Neural Networks 2023.
Selvaganapathy C, "Transforming Enterprise Knowledge Management Using Large Language Models (LLM)"; Nov. 6, 2023; The AI Discovery.
Kim et al., "Q-Selector-Based Prefetching Method for DRAM/NVM Hybrid Main Memory System"; Dec. 16, 2020; MDPI.

(Continued)

*Primary Examiner* — Jae U Yu
(74) *Attorney, Agent, or Firm* — Pearl Cohen Zedek Latzer Baratz LLP

(57) ABSTRACT

A Data Storage Device (DSD) includes a first memory storing reference files used to derive vector embeddings in a vector database. A query vector embedding is received from a host and one or more vector embeddings similar to the query vector embedding are identified in the vector database. One or more reference files from which the one or more vector embeddings were derived are identified and stored in a second memory for faster access. In another aspect, a query vector embedding is received by a host that identifies one or more vector embeddings that are similar to the query vector embedding and retrieves the one or more vector embeddings from a DSD to provide to an Artificial Intelligence (AI) model. One or more reference files are identified from which the one or more vector embeddings were derived and are prefetched from the DSD for storage in a host memory.

20 Claims, 5 Drawing Sheets

(56) References Cited

OTHER PUBLICATIONS

Chakraborttii et al., "Learning I/O Access Patterns to Improve Prefetching in SSDs"; Sep. 2020; The European Conference on Machine Learning and Principles and Practice of Knowledge Discovery in Databases.
Wang et al. "An Efficient Memory System Design with Specialized Caching Mechanism for Recommendation Inference"; Sep. 9, 2023; ACM Transactions on Embedded Computing Systems, vol. 22, Issue 56, Article No. 100, pp. 1-22.
James Luan, "ChatGPT+Vector Database+Prompt-As-Code—The CVP Stack"; Apr. 4, 2023.
Levine et al., "Investing in Pinecone"; Apr. 27, 2023.
Mark Hinkle, "Vector Databases: Long-Term Memory for Artificial Intelligence"; May 12, 2023; The New Stack.
Microsoft, "What Is a Vector Database?"; Dec. 13, 2023.
Pending U.S. Appl. No. 18/449,116 by Sun et al., "Computational SSD Supporting Rapid File Semantic Search", filed Aug. 14, 2023.
Pending U.S. Appl. No. 18/449,165 by Sun et al., "Error Correction Methods for Computational SSD Supporting Rapid File Semantic Search", filed Aug. 14, 2023.

\* cited by examiner

REFERENCE FILE MANAGEMENT FOR ARTIFICIAL INTELLIGENCE MODELS

BACKGROUND

Artificial Intelligence (AI) models, such as Large Language Models (LLMs), are increasingly relying on vector databases that store vector embeddings to provide information on data that can be used by the AI model. Vector databases store and index information about data as vectors in a high-dimensional space. Data such as text, images, audio, or video are transformed into vector embeddings and stored in the vector database so that similarity searches can be performed to find groups of data that are similar with respect to particular characteristics.

In some cases, vector embeddings that are relevant to a query may be provided to an AI model such as an LLM to reduce hallucinations (i.e., responses that are incorrect or non-sensical) or to improve awareness of previous queries (i.e., to reduce statelessness) by using reference files that are relevant to particular fields or that are based on previous queries or more current information to improve responses. The reference files can be transformed into vector embeddings stored in a vector database to find the relevant information more easily. Although the vector embeddings can be used by the AI model, the underlying reference files typically consume a large amount of storage that often due to cost are stored in memory that is relatively lower performance. This can cause delay when users or applications want to access one or more reference files related to a response.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
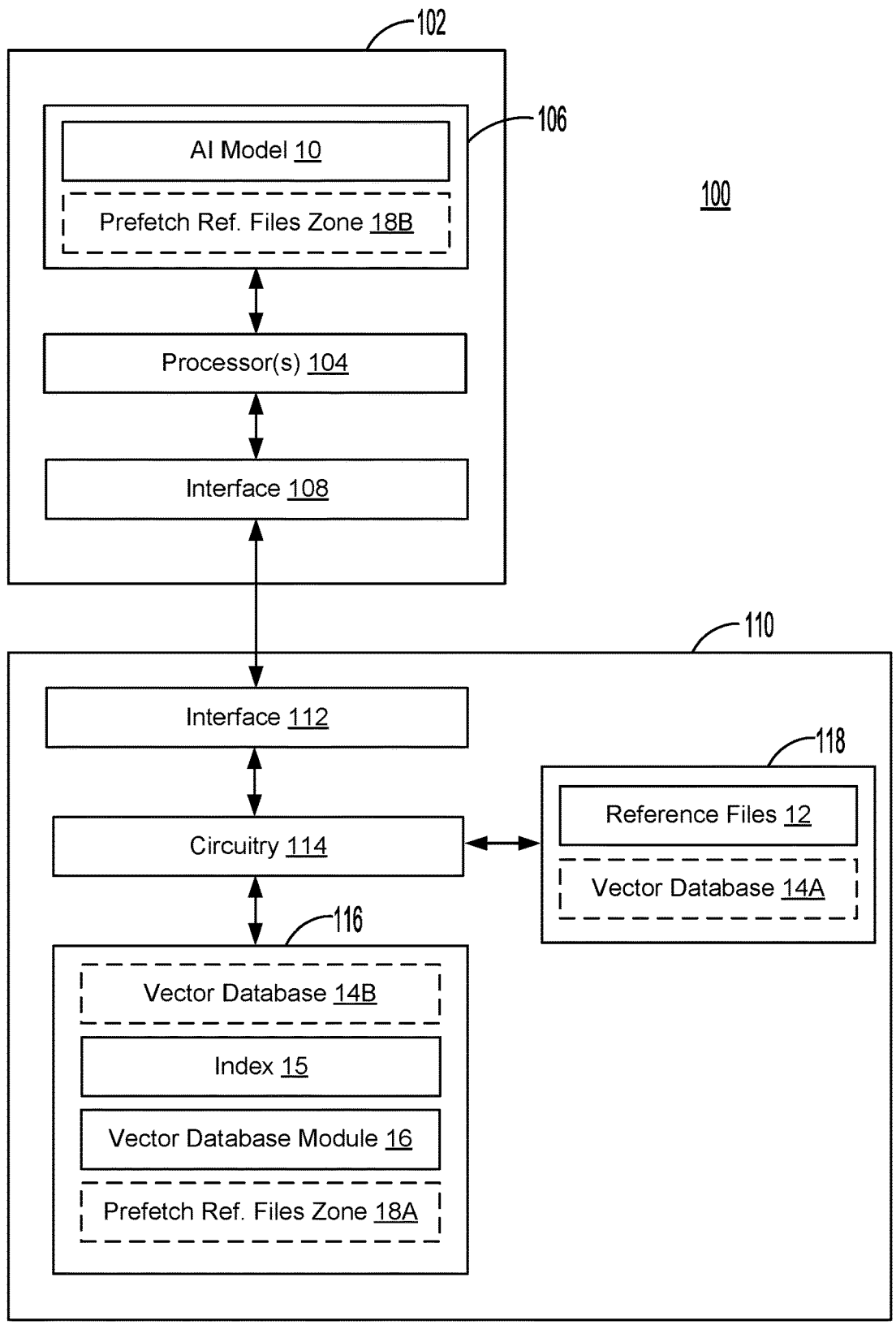
FIG. 1 is a block diagram of an example system for prefetching reference files where a Data Storage Device (DSD) searches a vector database according to one or more embodiments.

FIG. 1 is a block diagram of an example system 100 for prefetching reference files where Data Storage Device (DSD) 110 searches a vector database according to one or more embodiments. As shown in FIG. 1, system 100 includes host 102 and DSD 110. In some implementations, host 102 and DSD 110 can form, for example, a computer system, such as a desktop, laptop, or client and server. In this regard, host 102 and DSD 110 may be housed separately, such as where host 102 may be a client accessing DSD 110 as a server. In other implementations, host 102 and DSD 110 may be housed together as part of a single electronic device. In other implementations, host 102 and DSD 110 may not be co-located and may be in different geographical locations.

Host 102 includes one or more processors 104, interface 108, and one or more local memories 106. Processor(s) 104 can include, for example, circuitry such as one or more Central Processing Units (CPUs), Graphics Processing Units (GPUs), microcontrollers, Digital Signal Processors (DSPs), Application-Specific Integrated Circuits (ASICs), Field Programmable Gate Arrays (FPGAs), hard-wired logic, analog circuitry and/or a combination thereof. In some implementations, processor(s) 104 can include a System on a Chip (SoC) that may be combined with one or more memories 106 of host 102 and/or interface 108. In the example of FIG. 1, processor(s) 104 execute instructions, such as instructions from Artificial Intelligence (AI) model 10, an operating system of host 102, or other applications executed by host 102.

Host 102 can communicate with DSD 110 using interface 108 via a bus or network, which can include, for example, a Compute Express Link (CXL) bus, Peripheral Component Interconnect express (PCIe) bus, a Network on a Chip (NoC), a Local Area Network (LAN), or a Wide Area Network (WAN), such as the internet or another type of bus or network. In this regard, interface 108 can include a network interface card in some implementations. In some examples, host 102 can include software for controlling communication with DSD 110, such as a device driver of an operating system of host 102.

As shown in the example of FIG. 1, host 102 includes its own local memory or memories 106, which can include, for example, a Dynamic Random Access Memory (DRAM), Static Random Access Memory (SRAM), Magnetoresistive RAM (MRAM) or other type of Storage Class Memory (SCM), or other type of solid-state memory. Memory or memories 106 store AI model 10 or portions thereof, in addition to optionally storing prefetch reference files zone 18B. In implementations where the prefetch reference files zone is located in one or more memories 106 of host 102, such memory can serve as part of a host memory buffer that is allocated by an operating system of host 102 for use by DSD 110 as a faster access memory than memory 118. In other implementations, the prefetch reference files zone is instead located in memory 116 of DSD 110, which can serve as a controller memory buffer that is used by DSD 110 as a faster access memory than memory 118. The dashed outlines for prefetch reference files zones 18A and 18B in FIG. 1 indicate the alternative locations for the prefetch reference files zone.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), MRAM, 3D-XPoint memory, and/or other discrete Non-Volatile Memory (NVM) chips, or any combination thereof.

In the example of FIG. 1, memory or memories 106 of host 102 store AI model 10, or portions thereof for execution by processor(s) 104. In some implementations, AI model 10 can include a Large Language Model (LLM) that can process textual queries to respond with natural language, or another type of generative AI model that can generate text, images, or other types of data as a response to a query from a user or an application. In the example of LLMs, such AI models are typically trained using large amounts of text and can be used for a wide variety of tasks, including, for example, translation, writing, and question answering. LLMs or other types of AI models can be used by the public at large, such as with ChatGPT developed by OpenAI and Bard developed by Google. However, LLMs and other types of AI models can also be used by specific groups, such as, for example, within a company or a university, or by a particular department or group of users in an organization. Such AI models may be specially trained to better answer queries from particular groups of users or applications, such as doctors, programmers, or researchers in a certain field, for example.

In some cases, the AI model can receive a prompt in addition to a query that may cause the AI model to behave a certain way, such as a prompt to provide travel agent functions or to identify diseases in medical imaging, for example. The AI model may then access data in a knowledge base related to such prompts and queries to provide more accurate or more useful responses. Instead of accessing an entire file or an entire data object, the AI model may only need to access certain relevant portions of the files or data objects.

Vector databases enable portions of the reference files or portions of the data objects (i.e., chunks of the reference files or data objects) to be searched relatively quickly for relevant information in the knowledge base. The reference files or data objects are transformed using the AI model into mathematical vector embeddings of a high dimension to represent the information for the portion of the reference file or data object. The vector embeddings are stored in the vector database with vector metadata, which may be included in a vector index and/or metadata index for the vector database to enable efficient searching of the vector database.

As discussed in more detail below, AI model 10 can receive a query from a user or application, such as from a remote user interface executed at a laptop or smartphone, for example, or from an application executed at host 102, and then convert or transform the query into a query vector that is provided to DSD 110 to identify one or more vector embeddings in a vector database that are similar to the query vector. Circuitry 114 of DSD 110 may use an Approximate Nearest Neighbor (ANN) search to locate one or more vector embeddings in vector database 14A or 14B that represent portions of one or more reference files or data objects from reference files 12. The similar vector embeddings are then provided to AI model 10 at host 102 to help in answering the query by providing additional context or semantic information related to the query.

Notably, circuitry 114 also identifies one or more reference files from which the one or more vector embeddings sent to host 102 were derived. The reference file or files can be identified using vector metadata that is included as part of vector database 14A or 14B and/or as part of index 15. In some implementations, the vector metadata may have been used as part of a filtering operation in the ANN search. The vector metadata may indicate a relationship between the vector embedding and the portion of the reference file used to create the vector embedding. The identified reference file or files are then stored in memory 116 to cache or prefetch the reference file or files for faster access if a user or an application requests the reference file or files related to the query response.

As shown in the example of FIG. 1, DSD 110 includes interface 112, circuitry 114, memory 116, and storage memory 118. In some implementations, DSD 110 can include, for example, a Solid-State Drive (SSD) that includes solid-state storage media, or a Solid-State Hybrid Drive (SSHD) that includes both solid-state media and rotating magnetic disk media for data storage. Memory 116 is configured to provide faster access to data (e.g., reading and/or writing data) than memory 118. In this regard, memory 116 can be considered a higher performance memory than memory 118 in terms of how quickly operations can be performed to access data. As a result, memory 116 may cost more and have a smaller data storage capacity as compared to memory 118 that stores reference files 12.

Interface 112 of DSD 110 can communicate with host 102 via a bus or network, which can include, for example, a CXL bus, PCIe bus, an NoC, a LAN, or a WAN, such as the internet or another type of bus or network. In this regard, interface 112 may include a network interface card in some implementations.

Circuitry 114 can include, for example, one or more CPUs or other type of processors, microcontrollers, DSPs, ASICs, FPGAs, hard-wired logic, analog circuitry and/or a combination thereof that controls operation of DSD 110. In some implementations, circuitry 114 can include an SoC that may be combined with one or more memories of DSD 110 and/or interface 112.

Memory 118 can include one or more memory devices, such as solid-state memory devices and/or hard disk devices for non-volatilely storing reference files 12 and vector database 14A for AI model 10 executed by host 102. In this regard, DSD 110 in some implementations can include a data storage system with multiple storage devices for memory 118.

In some implementations, the vector database may instead be stored in memory 116 as vector database 14B or vector database 14B may represent a portion of the full vector database stored in memory 118 that has been loaded into memory 116 for searching the vector database or other operations. The dashed outlines of vector databases 14A and 14B in FIG. 1 indicate different possible locations of the vector database in system 100.

Reference files 12 may serve as a knowledge base for AI model 10 in responding to queries and may include different types of data, such as text, images, audio, or video. As used herein, a "reference file" includes a related set of data and is not limited to files used in a hierarchal file system. In this regard, reference files 12 can include data arranged as objects used in object storage and/or as conventional files used in a file system.

Vector database 14A includes vector embeddings of portions of the files and/or objects of reference files 12. The reference files may be divided into portions or chunks that are each embedded or transformed by AI model 10 into vectors of a high dimension to represent the data portions. For example, AI model 10 may use a first type of embedding model to generate vector embeddings for a video that divides the video into frames and derives values for each frame in respective vector embeddings to spatially represent the image in the frame. In this regard, AI model 10 may use different embedding models to generate vector embeddings for different types of reference files, such as for text, audio, or video.

The vector embeddings are stored in the vector database with vector metadata that can include a reference or pointer to the reference file that was used to create the vector embedding. The vector database can include a vector index and/or a metadata index in some implementations that may be used to search the vector database for similar vector embeddings to a query vector generated by AI model 10. In the example of FIG. 1, index 15 in memory 116 can include such a vector index and/or metadata index that includes vector metadata for vector embeddings in vector database 14A and/or 14B. Index 15 may be used by circuitry 114 executing vector database module 16 to identify vector metadata indicating the reference file or files from which one or more vector embeddings sent to host 102 were derived.

The search of the vector database for similar vector embeddings can be performed by circuitry 114 executing vector database module 16. The search may include an ANN search with operations such as determining a cosine of an angle between vectors, a Euclidian distance between vectors, or a dot product between vectors to identify similar vectors and return a certain number of nearest or most similar vector embeddings with respect to particular search criteria. A pre-filtering or post-filtering using vector metadata may also be performed to reduce the search field or to reduce the number of similar vector embedding results.

In the example of FIG. 1, memory 116 of DSD 110 can include one or more memory devices, such as a DRAM, SRAM, MRAM, or other type of solid-state memory device that facilitates a faster retrieval of data than memory 118. As shown in FIG. 1, memory 118 optionally stores vector database 14B, vector database module 16, and optionally stores prefetched reference files in prefetch reference files zone 18A.

Vector database module 16 can include computer-executable instructions that are executed by circuitry 114 to receive a query vector and search the vector database for similar vector embeddings. As discussed in more detail below, vector database module 16 can also identify the reference file or files that were used to create the similar vector embeddings or a subset of such similar vector embeddings that are sent to host 102 using vector metadata included in the vector database or in index 15. The reference file or files are then retrieved from reference files 12 in memory 118 to cache the reference file or files in prefetch reference files zone 18A of memory 116 or in prefetch reference files zone 18B in one or more memories 116 of host 102. If a user or an application requests the reference file or files related to a response, circuitry 114 or processor(s) 104 can provide the requested reference file or files more quickly from prefetch reference files zone 18A or 18B, respectively, than from memory 118 of DSD 110.

Those of ordinary skill in the art will appreciate with reference to the present disclosure that other implementations of system 100 may differ. For example, a separate data structure may be stored in memory 116 of DSD 110 or a memory 106 of host 102 for associating the reference files cached in prefetch reference files zone 18A or 18B with the vector embeddings provided to AI model 10. As another example variation, AI model 10 may not be executed by host 102 but may instead be executed by a remote server or by a cloud service in communication with host 102. As another example variation, vector database 14B stored in memory 116 may be omitted such that only vector database 14A is stored in memory 118. As yet another example, one or both of memories 116 and 118 may each comprise multiple memories of either a first type or a second type, rather than a single memory device. In addition, other implementations may omit one of prefetch reference files zone 18A or prefetch reference files zone 18B.

Figure 2:
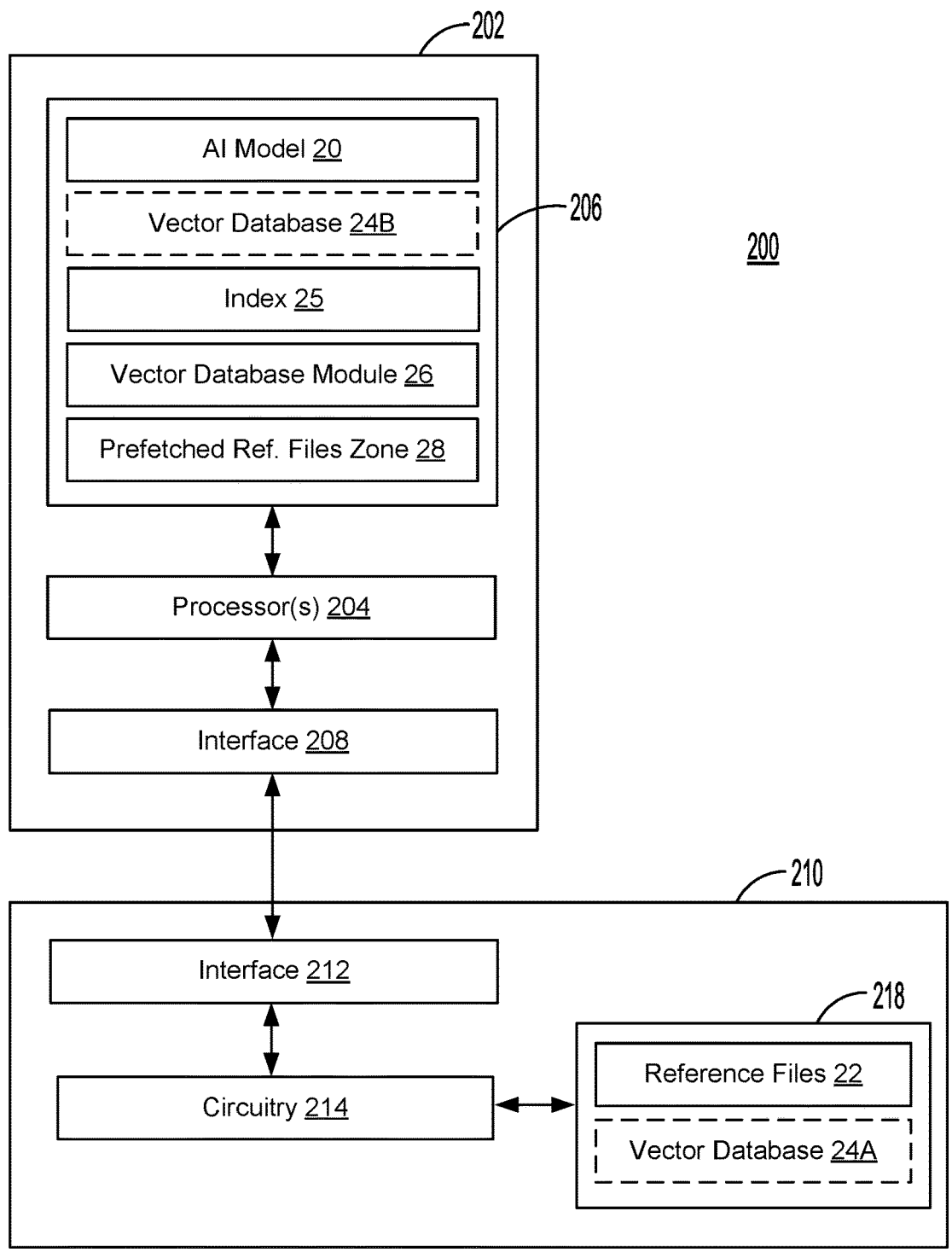
FIG. 2 is a block diagram of an example system for prefetching reference files where a host searches a vector database according to one or more embodiments.

FIG. 2 is a block diagram of an example system 200 for prefetching reference files where a host searches a vector database according to one or more embodiments. System 200 in FIG. 2 differs from system 100 discussed above for FIG. 1 in that the host searches the vector database and prefetches the related reference files from the DSD to cache in a local memory of the host, instead of the DSD searching the vector database and prefetching the related reference files.

As shown in the example of FIG. 2, system 200 includes host 202 and DSD 210. In some implementations, host 202 and DSD 210 can form, for example, a computer system, such as a desktop, laptop, or client and server. In this regard, host 202 and DSD 210 may be housed separately, such as where host 202 may be a client accessing DSD 210 as a server. In other implementations, host 202 and DSD 210 may be housed together as part of a single electronic device. In other implementations, host 202 and DSD 210 may not be co-located and may be in different geographical locations.

Host 202 includes one or more processors 204, interface 208, and one or more local memories 206. Processor(s) 204 can include, for example, circuitry such as one or more CPUs, GPUs, microcontrollers, DSPs, ASICs, FPGAs, hardwired logic, analog circuitry and/or a combination thereof. In some implementations, processor(s) 204 can include an SoC that may be combined with one or more memories 206 of host 202 and/or interface 208. In the example of FIG. 2, processor(s) 204 execute instructions, such as instructions from AI model 20, an operating system of host 202, or other applications executing on host 202.

Host 202 can communicate with DSD 210 using interface 208 via a bus or network, which can include, for example, a CXL bus, PCIe bus, an NoC, a LAN, or a WAN, such as the internet or another type of bus or network. In this regard, interface 208 can include a network interface card in some implementations. In some examples, host 202 can include software for controlling communication with DSD 210, such as a device driver of an operating system of host 202.

As shown in the example of FIG. 2, host 202 includes its own local memory or memories 206, which can include, for example, a DRAM, SRAM, MRAM or other type of SCM, or other type of solid-state memory. In the example of FIG. 2, memory or memories 206 of host 202 store AI model 20, vector database 24B, index 25, vector database module 26, and prefetched reference files in prefetch reference files zone 28.

In some implementations, AI model 20 can include an LLM or other type of generative AI model. AI model 20 can receive a query from a user or application, such as from a remote user interface executing on a laptop or smartphone, for example, or from an application executed at host 202, and then convert or transform the query into a query vector that is provided to vector database module 26 to identify one or more vector embeddings in the vector database that are similar to the query vector. Vector database module 26 can include computer-executable instructions that are executed by processor(s) 204. In the example of FIG. 2, one or more processors 204 of host 202 can load portions of vector database 24A from DSD 210 into memory or memories 206 as vector database 24B to search for the similar vector embeddings.

Processor(s) 204 of host 202 executing vector database module 26 may use an ANN search to locate one or more vector embeddings in vector database 24B that represent portions of one or more reference files from reference files 22 stored in memory 218 of DSD 210. The similar vector embeddings are then provided to AI model 20 to help in answering the query by providing additional context or semantic information related to the query.

Notably, processor(s) 204 also identify one or more reference files from which the one or more vector embeddings provided to AI model 20 were derived. The reference file or files can be identified using vector metadata that is included as part of vector database 24A or 24B and/or index 25. The vector metadata in some implementations may have been used as part of a filtering operation in the ANN search. The reference file or files are then prefetched by host 202 to cache or prefetch the reference file or files in prefetch reference files zone 28 for faster access if a user or an application requests the reference file or files related to the query response.

As shown in the example of FIG. 2, DSD 210 includes interface 212, circuitry 214, and storage memory 218. In some implementations, DSD 210 can include, for example, an SSD that includes solid-state storage media, or an SSHD that includes both solid-state media and rotating magnetic disk media for data storage. DSD 210 may also include a smaller memory similar to memory 116 in FIG. 1 or that may form part of circuitry 214 for executing a firmware of the DSD and/or for buffering data to be read from or stored in memory 218.

Interface 212 of DSD 210 can communicate with host 202 via a bus or network, which can include, for example, a CXL bus, PCIe bus, an NoC, a LAN, or a WAN, such as the internet or another type of bus or network. In this regard, interface 112 may include a network interface card in some implementations.

Circuitry 214 can include, for example, one or more CPUs or other type of processors, microcontrollers, DSPs, ASICs, FPGAs, hard-wired logic, analog circuitry and/or a combination thereof that controls operation of DSD 210. In some implementations, circuitry 214 can include an SoC that may be combined with one or more memories of DSD 210 and/or interface 212.

Memory 218 can include one or more memory devices, such as solid-state memory devices and/or hard disk devices for non-volatilely storing reference files 22 and vector database 24A. In this regard, DSD 210 in some implementations can include a data storage system with multiple storage devices for memory 218.

In some implementations, the vector database may instead be stored in one or more memories 206 of host 202 as vector database 24B or vector database 24B may represent a portion of the full vector database stored in memory 218 that has been loaded into memory 206 for searching the vector database or for other operations.

Reference files 22 may serve as a knowledge base for AI model 20 in responding to queries and may include different types of data, such as text, images, audio, or video. As noted above, reference files 22 can include data arranged as objects used in object storage and/or as conventional files used in a file system.

Vector database 24A includes vector embeddings of portions of the files and/or objects of reference files 22. In some implementations, the reference files may be divided into portions or chunks that are then each embedded or transformed by AI model 20 into vectors of a high dimension to represent different characteristics of the data portions. As noted above, AI model 20 may use different embedding models to generate vector embeddings for different types of reference files, such as for text, audio, or video.

The vector embeddings are then stored in the vector database with vector metadata that includes a reference to the reference file that was used to create the vector embedding. The vector database can include a vector index and/or a metadata index in some implementations that may be used to search the vector database for similar vector embeddings to a query vector generated by AI model 20 using a query. In the example of FIG. 2, index 25 in memory or memories 206 of host 202 can include such a vector index and/or metadata index or portions thereof loaded from vector database 24A or 24B that includes vector metadata for vector embeddings in vector database 24A and/or 24B. Index 25 may be used by processor(s) 204 executing vector database module 26 to identify vector metadata indicating the reference file or files from which one or more similar vector embeddings were derived.

The search performed by processor(s) 204 for similar vector embeddings may include an ANN search with operations such as determining a cosine of an angle between vectors, a Euclidian distance between vectors, or a dot product between vectors to identify similar vectors and return a certain number of nearest or most similar vector embeddings with respect to particular search criteria. A pre-filtering or post-filtering may also be performed using vector metadata to reduce the search field or the number of similar vector embedding results.

Those of ordinary skill in the art will appreciate with reference to the present disclosure that other implementations of system 200 may differ. For example, a separate data structure may be stored in memory 206 of host 202 for associating the reference files cached in prefetch reference files zone 28 with the vector embeddings provided to AI model 20 that were created from the reference file. As another example variation, AI model 20 may not be executed by host 202 but may instead be executed by a remote server or by a cloud service in communication with host 202. As another example variation, vector database 24B stored in memory or memories 206 of host 202 may be omitted such that only vector database 24A is stored in memory 218 of DSD 210. In another example, memory 218 of DSD 210 may comprise multiple memory devices, rather than a single memory device.

Example Processes

Figure 3:
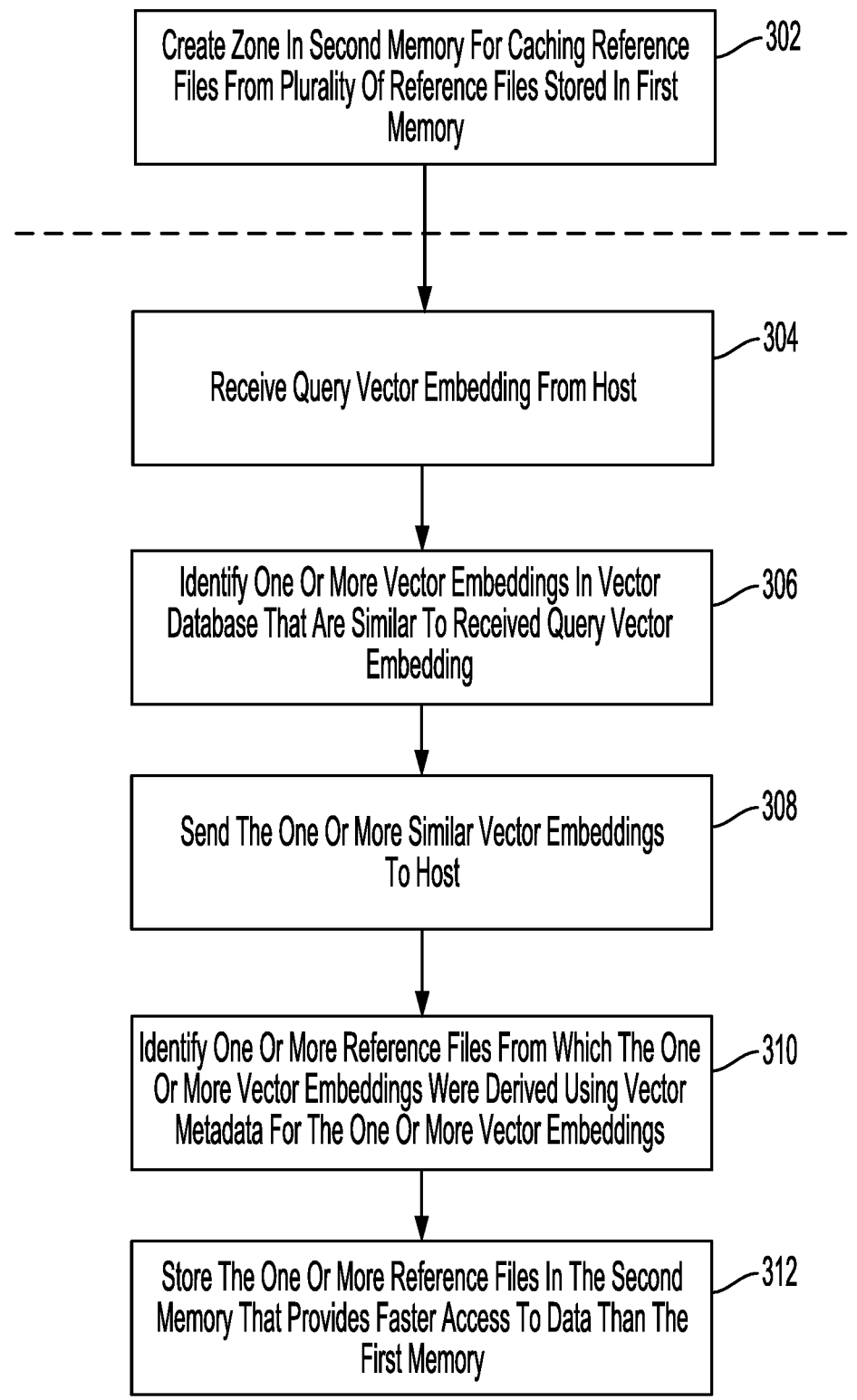
FIG. 3 is a flowchart for a reference file prefetch process performed by a DSD according to one or more embodiments.

FIG. 3 is a flowchart for a reference file prefetch process performed by a DSD according to one or more embodiments. The process of FIG. 3 can be performed by, for example, circuitry 114 of DSD 110 executing vector database module 16 in FIG. 1. In this regard, circuitry 114 can, in some implementations, comprise a means for performing the functions of the reference file prefetch process of FIG. 3.

In block 302, a zone is created in a second memory of the DSD or in a second memory of a host that is allocated to the DSD (e.g., a host memory buffer) for caching reference files from a plurality of reference files stored in a first memory of the DSD. The second memory is configured to access data faster than the first memory, such as by reading and/or writing data faster in the second memory as compared to the first memory. In this regard, the first memory may have a larger data storage capacity than the first memory in some implementations since the second memory may be a more expensive or higher performance memory. With reference to the example system of FIG. 1 discussed above, the zone created for caching the reference files can correspond to prefetch reference files zone 18A in memory 116 of DSD 110 or prefetch reference files zone 18B in memory or memories 106 of host 102.

The dashed line between blocks 302 and 304 in FIG. 3 can indicate that the creation of the zone in block 302 may occur well before receiving the query vector embedding in block 304. In some implementations, the creation of the zone in block 302 can be performed as part of a setup or formatting process of the DSD, which may occur at the factory in some cases. In other implementations, the zone may be created or configured by a user in the field, such as by defining a data storage size of the zone.

In block 304, a query vector embedding is received from a host. The vector embedding can come from an LLM or other type of AI model that transforms a query from a user or an application into a vector form that can be used by the AI model. In some implementations, the host may execute the AI model. In other implementations, another device or devices in communication with the host may execute the AI model, such as a cloud service or a remote server. The host provides the query vector embedding to the DSD for the DSD to find similar vector embeddings in a vector database stored in the DSD. The similar vector embeddings can then be used by the AI model to provide additional context or semantic information about the query to help in providing a more accurate or useful response to the query.

In block 306, the circuitry of the DSD performs a similarity determination for the query vector embedding by identifying one or more vector embeddings in the vector database that are similar to the received query vector embedding. In performing the search, the circuitry may use an ANN search that may include operations such as determining a cosine of an angle between two vectors, a Euclidian distance between two vectors, or a dot product between two vectors to identify similar vectors and return a certain number of nearest or most similar vector embeddings with respect to particular search criteria. A pre-filtering or post-filtering may also be performed using vector metadata to reduce the search field or the number of similar vector embedding results.

In block 308, the identified one or more similar vector embeddings are sent to the host based on the similarity determination. The host can then provide the one or more similar vector embeddings to the AI model. In some implementations, the DSD may also provide vector metadata for the one or more similar vector embeddings to the host. The vector metadata can identify a reference file from which the vector embedding was derived. For its part, the AI model may then provide a response to the query based at least in part on the query and the one or more similar vector embeddings. In some implementations, the AI model may also provide information or a link to a user interface indicating one or more reference files related to the response that may correspond to one or more reference files used to derive the one or more similar vector embeddings. In other cases, a user interface or application programming interface may provide a prompt for the user or application to request additional information related to the response.

In block 310, the circuitry of the DSD identifies one or more reference files from which the one or more similar vector embeddings were derived using vector metadata for the one or more similar vector embeddings before receiving a request for the reference file(s) from the host. The vector metadata in some implementations may be stored with their respective vector embeddings in the vector database or may be part of an index that is used to search the vector database.

In block 312, the one or more reference files identified in block 310 are stored in the second memory of the DSD that is accessed faster than the first memory where the reference files may otherwise be stored. In this regard, the reference files stored in the second memory in block 312 can be cached in the zone created in block 302. The DSD can prioritize storage of the one or more reference files in the second memory over at least one other operation performed by the DSD to help ensure the reference file(s) are ready to be accessed if requested from the host. For example, a maintenance activity such as garbage collection of data stored in the first memory may be paused in favor of prefetching the reference file(s). As another example, prefetching the reference file(s) can be performed ahead of other requests such as read or write commands that were received before identifying the reference file(s).

In some implementations, the reference files cached in the second memory may be flagged or otherwise marked in vector metadata, such as in index 15 in FIG. 1, to indicate which reference files have already been cached in the second memory. This can help ensure that only one copy of the reference file is cached in the second memory even though multiple vector embeddings derived from the reference file have been provided to the host for one or more query vectors.

As noted above, by storing or prefetching the reference files related to the similar vector embeddings sent to the host for the AI model, any requests received from the host for the reference files can be returned to the host quicker than accessing the reference files from the first memory. In some cases, the reference files may remain cached in the second memory for a predetermined period of time or the zone created in block 302 for caching the reference files may overwrite the oldest cached reference file when needed to make space for a new reference file related to a more recent query vector received from the host.

Those of ordinary skill in the art will appreciate with reference to the present disclosure that other implementations of the reference file prefetch process of FIG. 3 may differ. For example, the identification of the one or more reference files in block 310 may occur in some implementations before or contemporaneously with sending the one or more similar vector embeddings to the host in block 308 or identifying the one or more similar vector embeddings in block 306. As another example variation, block 302 may be omitted in some implementations such that the one or more reference files are stored in the second memory in block 312 without being stored in a particular zone designated for storing prefetched reference files.

Figure 4:
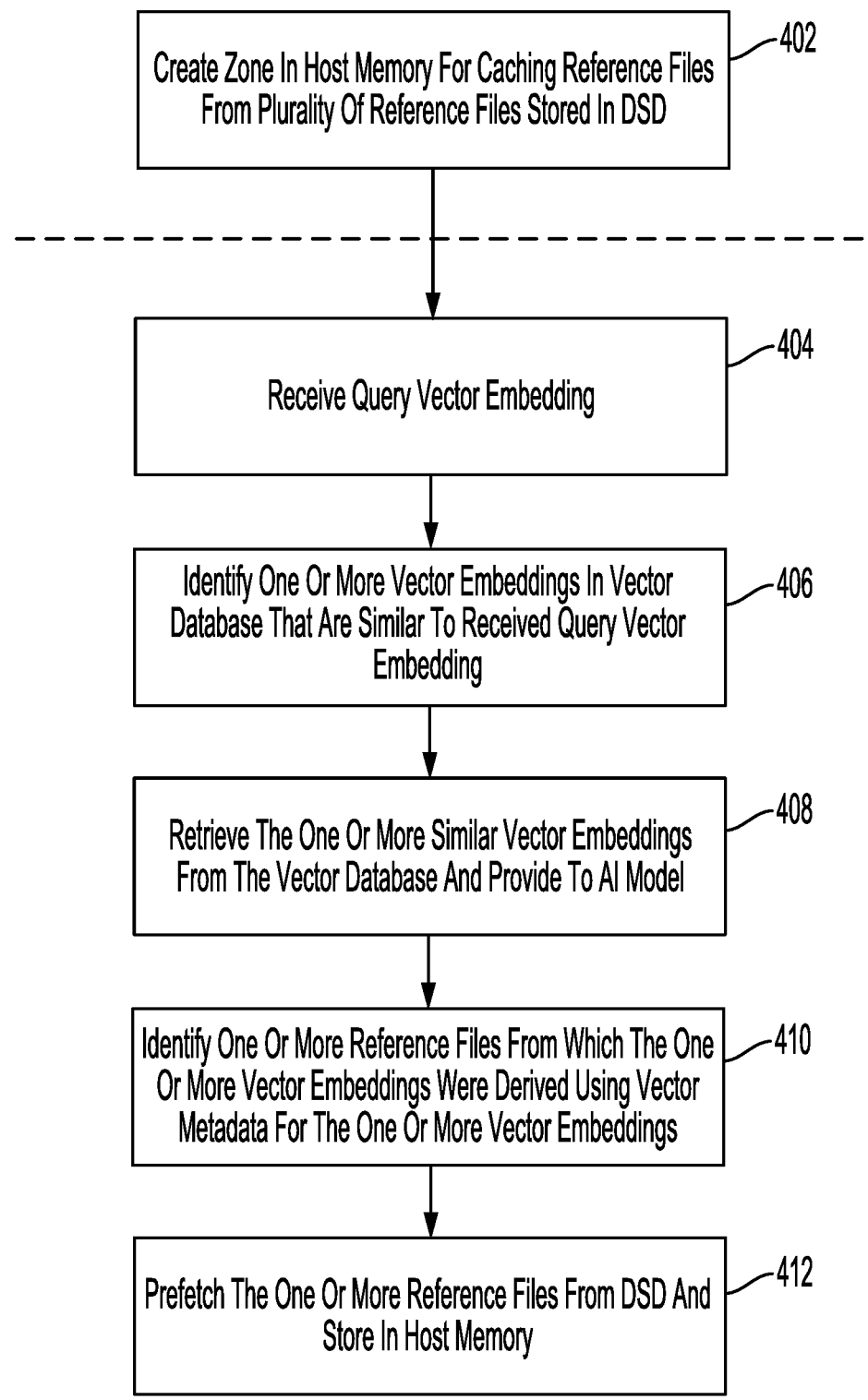
FIG. 4 is a flowchart for a reference file prefetch process performed by a host according to one or more embodiments.

FIG. 4 is a flowchart for a reference file prefetch process performed by a host according to one or more embodiments. The process of FIG. 4 can be performed by, for example, one or more processors 204 of host 202 in FIG. 2 executing vector database module 26. In this regard, processor(s) 204 can, in some implementations, comprise a means for performing the functions of the reference file prefetch process of FIG. 4.

In block 402, a zone is created in a host memory for caching reference files from a plurality of reference files stored in a DSD. The host memory is configured to access data faster by the host than from the DSD, such as by reading and/or writing data faster in the host memory as compared to reading and/or writing data in a storage memory of the DSD. In this regard, the DSD may have a larger data storage capacity than the host memory and the host may load data from the DSD into the host memory for use by one or more processors of the host executing an application, such as an AI model. With reference to the example system of FIG. 2 discussed above, the zone created for caching the reference files can correspond to prefetch reference files zone 28 in memory or memories 206 of host 202.

The dashed line between blocks 402 and 404 in FIG. 4 can indicate that the creation of the zone in block 402 may occur well before receiving the query vector embedding in block 404. In some implementations, the creation of the zone in block 402 can be performed as part of a setup process for the AI model and may be created or configured by a user in the field, such as by defining a data storage size of the zone.

In block 404, a query vector embedding is received from an AI model that transforms a query from a user or an application into a vector form that can be used by the AI model. In some cases, the AI model may be executed at the host. In other cases, the AI model may be executed at another device or devices in communication with the host, such as a cloud service or a remote server. The query vector embedding is used by the host to find similar vector embeddings in a vector database that may be stored at a DSD in communication with the host. In some implementations, the host may load portions of the vector database into a local memory for searching or may locally store one or more indexes for searching the vector database, such as a vector index and/or a metadata index.

In block 406, the processor or processors of the host perform a similarity determination for the query vector embedding by identifying one or more vector embeddings in the vector database that are similar to the received query vector embedding. In performing the search, the processor(s) may use an ANN search that may include operations such as determining a cosine of an angle between two vectors, a Euclidian distance between two vectors, or a dot product between two vectors to identify similar vectors and return a certain number of nearest or most similar vector embeddings with respect to particular search criteria. A pre-filtering or post-filtering may also be performed using vector metadata to reduce the search field or the number of similar vector embedding results.

In block 408, the identified one or more similar vector embeddings are retrieved from the vector database stored in the DSD based on the similarity determination. The retrieved vector embedding(s) are then provided to the AI model. The host may use a locally stored index, such as a metadata index for the vector database, to request the one or more vector embeddings from the DSD. The similar vector embeddings can then be used by the AI model to provide additional context or semantic information about the query to help in providing a more accurate or useful response to the query.

In some implementations, the AI model may also provide information or a link indicating one or more reference files related to the response that may correspond to one or more reference files used to derive the one or more similar vector embeddings. In other cases, a user interface or application programming interface may provide a prompt to request additional information related to the response.

In block 410, the processor(s) of the host identify one or more reference files from which the one or more similar vector embeddings were derived using vector metadata for the one or more similar vector embeddings. In some cases, vector metadata used by the processor(s) to identify the similar vector embedding(s) can also identify a reference file from which the vector embedding was derived. The vector metadata in some implementations may be stored with their respective vector embeddings in the vector database or may be part of a metadata index that is used to search the vector database.

In block 412, the one or more reference files identified in block 410 are prefetched from the DSD and stored in at least one host memory for faster access. In this regard, the reference files stored in the host memory in block 412 can be cached in the zone created in block 402. In some implementations, the processor(s) of the host can prioritize prefetching the one or more reference files from the DSD over at least one other operation performed by the host and/or the DSD to help ensure the reference file(s) are ready to be accessed if requested by a user or an application. For example, a maintenance activity being performed by a driver executed by the host, such as garbage collection of data stored in the DSD, may be paused in favor of prefetching the reference file(s). As another example, prefetching the reference file(s) can be performed ahead of other requests such as read or write commands from other applications executed by the host that were received before identifying the reference file(s).

In some implementations, the reference files cached in the host memory may be flagged or otherwise marked in vector metadata, such as in index 25 in FIG. 2, to indicate which reference files have already been cached in the host memory. This can help ensure that only one copy of the reference file is cached in the host memory even though multiple vector embeddings derived from the reference file have been provided to the AI model for one or more query vectors.

As noted above, by caching or prefetching the reference files related to the similar vector embeddings provided to the AI model, any requests received from the user or an application for the reference files can be returned quicker than accessing the reference files from the DSD. In some cases, the reference files may remain cached in the host memory for a predetermined period of time or the zone created in block 402 for caching the reference files may overwrite the oldest cached reference file when needed to make space for a new reference file related to a more recent query vector received from the AI model.

Those of ordinary skill in the art will appreciate with reference to the present disclosure that other implementations of the reference file prefetch process of FIG. 4 may differ. For example, the identification of the one or more reference files in block 410 may occur in some implementations before or contemporaneously with providing the one or more similar vector embeddings to the AI model in block 408 or identifying the one or more similar vector embeddings in block 406. As another example variation, block 402 may be omitted in some implementations such that the one or more reference files are prefetched and stored in the host memory in block 412 without being stored in a particular zone designated for storing prefetched reference files.

Figure 5:
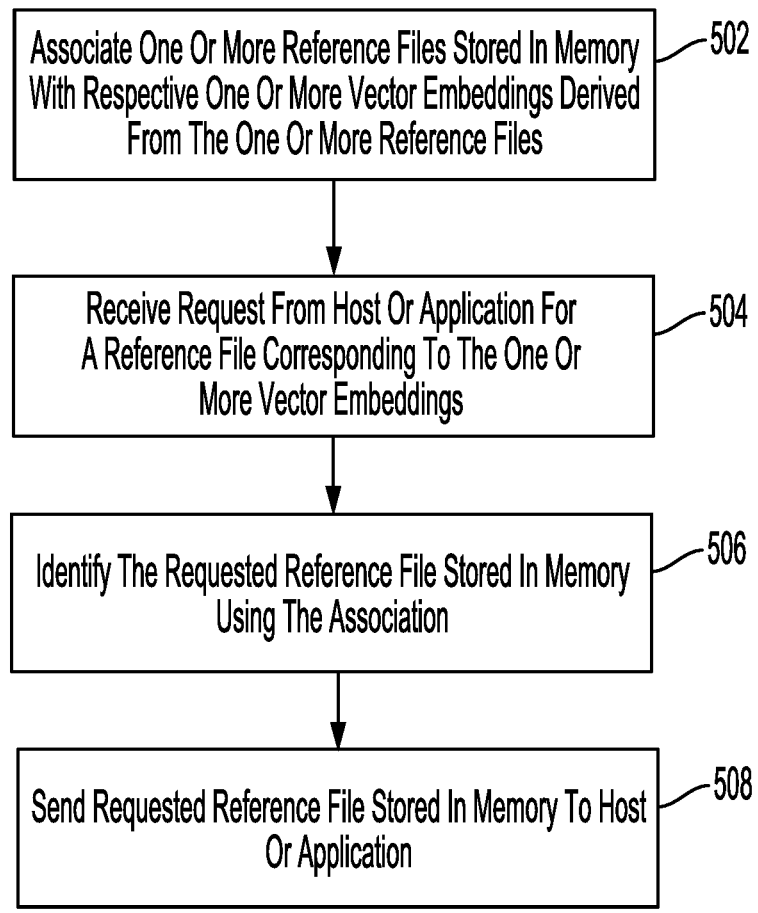
FIG. 5 is a flowchart for a reference file retrieval process according to one or more embodiments.

FIG. 5 is a flowchart for a reference file retrieval process according to one or more embodiments. The process of FIG. 5 can be performed by, for example, circuitry 114 of DSD 110 in FIG. 1 executing vector database module 16 or by processor(s) 204 of host 202 in FIG. 2 executing vector database module 26. In this regard, circuitry 114 or processor(s) 204 can, in some implementations, comprise a means for performing the functions of the reference file retrieval process of FIG. 5.

In block 502, one or more reference files stored in a faster access memory are associated with respective one or more vector embeddings derived from the one or more reference files. With reference to the example of FIG. 1 discussed above, the faster access memory can include memory 116 of DSD 110 or memory/memories 106 of host 102 that are accessed faster than the second memory 118 of DSD 110. With reference to the example of FIG. 2 discussed above, the faster access memory can include memory or memories 206 of host 202 that are accessed faster than second memory 218 of DSD 210.

The association can include, for example, adding entries in a data structure maintained in the faster access memory that uses vector embedding identifiers (e.g., vector IDs) to associate each vector embedding provided to the AI model with the reference file cached in the faster memory from which the vector embedding was derived. In other implementations, an index (e.g., index 15 in FIG. 1 or index 25 in FIG. 2) may be used to flag or otherwise indicate which reference files have been cached in the faster memory and serve to associate the cached reference files with vector embeddings derived from the cached reference files.

In block 504, a request is received from a host or an application for a reference file corresponding to one or more vector embeddings that were provided to the AI model in generating a response to a query. The one or more vector embeddings may be identified by the AI model as being used for the response. A user or an application may request more information about the response, such as by clicking a link included with the response in a user interface for more information. The AI model may then request the reference file or files that were used in generating the response by requesting the reference file or files from which the vector embeddings used in generating the response were derived from.

In block 506, the processor(s) or circuitry identify the requested file stored in the faster memory using the association between the one or more vector embeddings and the reference files stored in the faster memory. In some implementations, the association can include an index such as a vector index or metadata index, or a portion thereof, stored in the faster memory that indicates which reference files are stored in the faster memory and associates the one or more vector embeddings provided to the AI model with the reference file or files from which the vector embeddings were derived.

In block 508, the requested reference file stored in the faster memory is sent to the host or application that initiated the request. Since the reference file has been cached in the faster memory, it can be provided to the host or application quicker than if it was retrieved from a slower access storage memory used to store the reference files used as a knowledge base for the AI model.

Those of ordinary skill in the art will appreciate with reference to the present disclosure that other implementations of the reference file retrieval process of FIG. 5 may differ. For example, blocks 502 and 506 may be omitted in implementations where the AI model has identification information for the reference file or files used in generating the response, such as in cases where the vector embeddings are provided to the AI model with the name of the reference file or files used to create the vector embeddings. In such cases, the host or application via the AI model may directly request the reference file, such as by providing a file name, object name, or other identifier for the reference file.

As discussed above, the foregoing systems for managing reference files can improve the processing times of accessing reference files related to responses provided by AI models. By making greater use of vector metadata for the reference files that is already available to the device searching for similar vector embeddings, it is ordinarily possible to prefetch or cache reference files that are related to or used in responding to a query. The reference files are then ready for faster retrieval by the user or by an application that may need more information about a response.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
a first memory configured to store a plurality of reference files that have been used to derive a plurality of vector embeddings in a vector database stored in the DSD; and
circuitry configured to:
receive a query vector embedding from a host;
perform an Approximate Nearest Neighbor (ANN) search of the vector database to identify one or more vector embeddings that are close to the query vector embedding;
send the one or more vector embeddings to the host;
identify one or more reference files from which the one or more vector embeddings were derived using vector metadata for the one or more vector embeddings; and
store the one or more reference files in a second memory of the host or of the DSD, the second memory configured to provide access to data faster than the first memory.

2. The DSD of claim 1, wherein the circuitry is further configured to create a zone in the second memory for caching reference files from the plurality of reference files stored in the first memory.

3. The DSD of claim 1, wherein the circuitry is further configured to prioritize storage of the one or more reference files in the second memory over at least one other operation performed by the DSD.

4. The DSD of claim 1, wherein the circuitry is further configured to:
associate the one or more reference files stored in the second memory with the respective one or more vector embeddings derived from the one or more reference files;
receive a request from the host for a reference file corresponding to the one or more vector embeddings;
identify the requested reference file stored in the second memory using the association; and
send the requested reference file stored in the second memory to the host.

5. The DSD of claim 1, wherein the circuitry is further configured to perform the ANN search by comparing the query vector embedding with a plurality of candidate vector embeddings in the vector database to identify the one or more vector embeddings that are closest to the query vector embedding.

6. The DSD of claim 5, wherein the circuitry is further configured to perform the ANN search of the vector database by at least one of determining a cosine of an angle between candidate vector embeddings and the query vector embedding, determining a Euclidian distance between candidate vector embeddings and the query vector embedding and determining a dot product between candidate vector embeddings and the query vector embedding to identify the one or more vector embeddings.

7. The DSD of claim 1, wherein the circuitry is further configured to use the vector metadata as part of a filtering operation in a search for the one or more vector embeddings.

8. The DSD of claim 1, wherein the second memory is further configured to store an index that includes vector metadata for the plurality of vector embeddings in the vector database, and wherein the circuitry is further configured to identify the vector metadata for the one or more vector embeddings using the index.

9. A method performed by a host for an Artificial Intelligence (AI) model, the method comprising:
receiving a query vector embedding;
performing an Approximate Nearest Neighbor (ANN) search of a vector database to identify one or more vector embeddings in the vector database that are similar to the query vector embedding;
retrieving the one or more vector embeddings from the vector database;
providing the one or more vector embeddings to the AI model;
identifying one or more reference files from which the one or more vector embeddings were derived using vector metadata for the one or more vector embeddings;
prefetching the one or more reference files from a Data Storage Device (DSD); and
storing the prefetched one or more reference files in at least one memory of the host.

10. The method of claim 9, further comprising creating a zone in the at least one memory of the host for caching reference files from a plurality of reference files stored in the DSD.

11. The method of claim 9, further comprising prioritizing the prefetching of the one or more reference files from the DSD over at least one other operation performed by at least one of the host and the DSD.

12. The method of claim 9, further comprising:
associating the one or more reference files stored in the at least one memory with the respective one or more vector embeddings derived from the one or more reference files;
receiving a request from an application for a reference file corresponding to the one or more vector embeddings;
identifying the requested reference file stored in the at least one memory using the association; and
sending the requested reference file stored in the at least one memory to the application.

13. The method of claim 9, further comprising performing the ANN search by comparing the query vector embedding with a plurality of candidate vector embeddings in the vector database to identify the one or more vector embeddings that are closest to the query vector embedding.

14. The method of claim 13, further comprising performing the ANN search of the vector database by at least one of determining a cosine of an angle between candidate vector embeddings and the query vector embedding, determining a Euclidian distance between candidate vector embeddings and the query vector embedding and determining a dot product between candidate vector embeddings and the query vector embedding.

15. The method of claim 9, further comprising using the vector metadata as part of a filtering operation in a search for the one or more vector embeddings.

16. The method of claim 9, wherein the at least one memory of the host further stores an index that includes vector metadata for a plurality of vector embeddings in the vector database, and wherein the method further comprises identifying the vector metadata for the one or more vector embeddings using the index.

17. A Data Storage Device (DSD), comprising:
a first memory configured to store a plurality of reference files that have been used to derive a plurality of vector embeddings in a vector database stored in the DSD; and
means for:

receiving a query vector embedding from a host;

performing an Approximate Nearest Neighbor (ANN) search of the vector database to identify one or more vector embeddings that are close to the query vector embedding;

sending the one or more vector embeddings to the host;

identifying one or more reference files from which the one or more vector embeddings were derived using vector metadata for the one or more vector embeddings; and storing the one or more reference files in a second memory of the host or of the DSD, the second memory configured to provide access to data faster than the first memory.

18. The DSD of claim 17, further comprising means for prioritizing the storage of the one or more reference files in the second memory over at least one other operation performed by the DSD.

19. The DSD of claim 17, further comprising means for:

associating the one or more reference files stored in the second memory with the respective one or more vector embeddings derived from the one or more reference files;

receiving a request from the host for a reference file corresponding to the one or more vector embeddings;

identifying the requested reference file stored in the second memory using the association; and sending the requested reference file stored in the second memory to the host.

20. The DSD of claim 17, wherein the second memory is further configured to store an index that includes vector metadata for the plurality of vector embeddings in the vector database, and wherein the DSD further comprises means for identifying the vector metadata for the one or more vector embeddings using the index.

* * * * *